United States Patent

[11] 3,618,642

| [72] | Inventor | Jean-Guy Beaulieu<br>Boucherville, Quebec, Canada |
|---|---|---|
| [21] | Appl. No. | 44,439 |
| [22] | Filed | June 8, 1970 |
| [45] | Patented | Nov. 9, 1971 |
| [73] | Assignee | General Foods Limited<br>Toronto, Ontario, Canada |
| [32] | Priority | June 9, 1969 |
| [33] |  | Canada |
| [31] |  | 53,755 |

[54] COFFEE-PACKAGING MACHINE
10 Claims, 3 Drawing Figs.
[52] U.S. Cl. ................................................. 141/1,
141/174, 141/176, 141/282, 221/176
[51] Int. Cl. ................................................. B65b 43/44
[50] Field of Search ........................................ 141/173,
174, 175, 176, 281, 282, 194, 246, 265, 272, 1;
221/105, 176; 53/245

[56] References Cited
UNITED STATES PATENTS
2,049,722 8/1936 Phillips et al. ................ 141/281

*Primary Examiner*—Houston S. Bell, Jr.
*Attorneys*—C. Garman Hubbard and Bruno P. Struzzi

ABSTRACT: This invention relates to the packaging of granular material, such as coffee, in the bottom of a series of stacked cups and has special use in the dispensing of coffee into cups in this fashion for the subsequent making of a coffee beverage. The machine consists of a table and a jig for receiving the cups overlying the table. The cups are dropped into the jig and the jig moves the cups across the surface of the table and then over the edge of the table into a stacked form. As the cups move over the table, predetermined quantities of coffee are dropped into the cups so that, when they are subsequently stacked, each cup has a predetermined amount of instant coffee in the bottom. In use, one takes a cup from the stack and adds water as required to make a cup of beverage.

COFFEE-PACKAGING MACHINE

This invention relates to a device and to a method for packaging a predetermined amount of a granular material such as coffee in the bottom of each of a series of stacked cups.

The invention will be described in relation to the packaging of a predetermined amount of instant coffee but it will be understood that any material may be substituted for coffee as required by a particular use. It is customary for caterers to serve hot coffee from an insulated urn in disposable paper or plastic cups. The coffee is often brewed at a central location and transported to the place of use in the insulating urn. Difficulties with this method of serving coffee have been encountered. Once coffee has been brewed, it should not be reheated and difficulty has been experienced in maintaining the coffee hot over extended periods of time. Moreover any coffee that is left after serving must be disposed of as waste because it is impossible to hold it for an extended period of time. Instant coffee has certain advantages from these points of view because it can be conveniently made at the point and time of use by adding hot water to the required quantity of granular instant coffee in the serving cup. There is no difficulty in maintaining water at a high temperature. Moreover one makes only the required amount in accordance with the demand. There is no need to throw away coffee because it is made by the cupful as required.

Many caterers have resorted to instant coffee in order to ensure that the beverage is hot when consumed and to avoid waste. Many of them have, by hand, measured the coffee and, in some cases, sugar into cups and stacked the cups so that at the time of serving they merely add hot water to the cup. The hand method of loading a stack of cups is very tedious and time consuming. Attempts have been made at devising a machine to automatically load coffee into cups and restack the cups but prior attempts have proved unsuccessful in providing a machine that will fill the cups at a fast rate of speed.

This invention overcomes these disadvantages and provides a device and method for efficiently and automatically dispensing a predetermined amount of coffee into each of a series of stacked cups.

Generally speaking, a device according to the invention for dispensing a granulated material into each of a series of stacked cups comprises a table, a jig for a cup overlying said table, jig drive means adapted to cyclically carry said jig in a predetermined path over the surface of the table. The surface of the table is formed with an edge on the predetermined path over which a cup held in the jig can drop. Cup-stacking means underlie the edge on the predetermined path and the jig is adapted to restrain the cup laterally but not vertically. A depositing means overlies the table on the predetermined path in advance of the opening in the table and is adapted to drop a cup into the jig as the jig underlies the depositing means on the predetermined path. Filling means overlie the table between the cup-stacking means and the depositing means and are adapted to drop a predetermined amount of granular material into a cup retained in the jig as the jig underlies the filling means.

The invention will be clearly understood after reference to the following detailed specification read in conjunction with the drawings.

Figure 1:
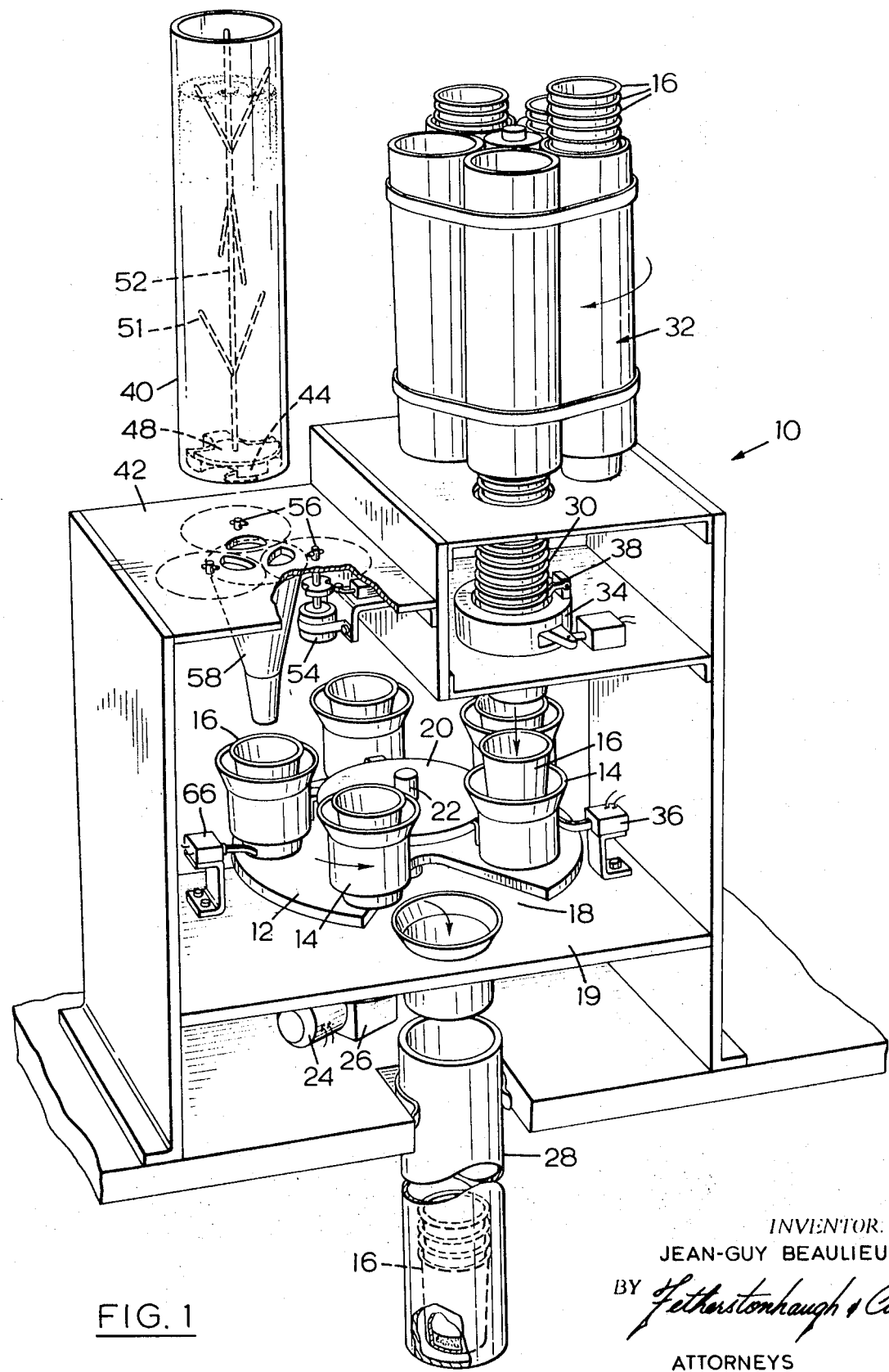
FIG. 1 is a perspective view partially exploded showing the general layout and construction of a machine according to the invention.

The numeral 10 generally refers to a machine according to the invention. It has a table 12 and five annular jigs 14, each adapted to receive a paper cup 16 and restrain it laterally on the table 12. Jigs 14 have a larger diameter than cups 16 so that they can fall therethrough when the cups pass over the edge of the opening 18 in the table 12, as will be explained later. Thus, the jigs 14 restrain the cups laterally but not vertically.

Figure 2:
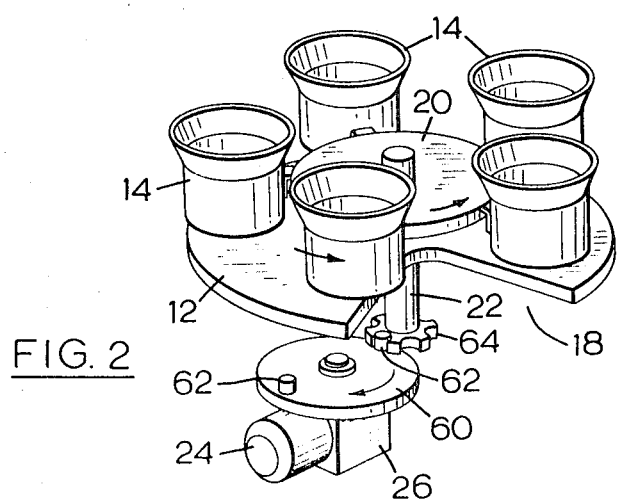
FIG. 2 is a detail illustrating the drive means for the cup-retaining jigs.

Table 12 is rigidly mounted above the shelf 19 of the frame of the machine and jig drive means are provided for cyclically carrying the jigs 14 in a predetermined circular path above the surface of the table 12. Each of the jigs 14 is mounted in spaced relation around the edge of disk 20 and disk 20 is in turn connected to the upper end of shaft 22. A motor 24 (see FIG. 2) rotates shaft 22 through gear box 26, plate 60 and the pins 62 and gear 64 of a Geneva cam mechanism so that when drive motor 24 is continuously rotated, jigs 14 are carried in a circular path above the surface of table 12 with an intermittent motion.

It will be noted that the surface of table 12 is formed with an opening 18 which underlies the circular path of the jigs 14 so that, in use, a cup 16 held by a jig can fall through the table 12 and into a cup-stacking chute 28 as it passes over the edge of the opening and as will be explained later.

In use, empty cups are dropped one at a time into the jigs 14 from a cup-depositing means as the jigs pass thereunder and a measured quantity of granular material, say, instant coffee, is deposited in the cups as they pass under a filling means.

The cup-depositing means is not of itself novel. It comprises a stack of empty cups 30 steadied by a tubular device 32 and restrained from falling by a dispensing head 34. Dispensing head 34 is switch operated by switch 36 to drop a single cup. In use, as the jigs 14 rotate they engage with and actuate switch 36 to cause the dispensing head 34 to drop a single cup into the underlying jig 14. The dispensing head and its actuation are generally known in the dispensing art and detail of their construction is not included in this application. It will not be noted that there are five stacks of cups. These stacks are actuated in such a manner that, when the stack over the dispensing head 34 becomes empty, a full one rotates into position over the dispensing head. When the last full stack is empty, switch 38 detects the condition and turns the machine off. This also is well known construction in dispensing and not a part of the inventive concept of this invention.

The purpose of the machine is to quickly, automatically and accurately drop a predetermined amount of instant coffee or the like into a cup and restack the cups.

Figure 3:
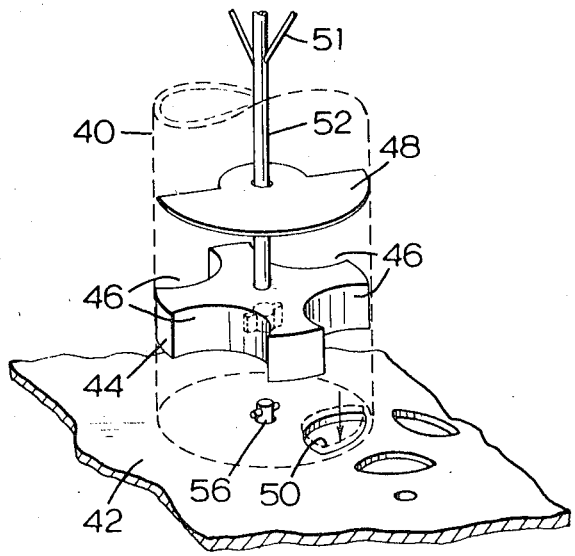
FIG. 3 is a detail showing the material measuring means in exploded form.

The filling is done from a dispensing assembly which includes three tubular coffee containers, similar to the one 40, that have dispensing mechanisms at their lower ends and that cooperate with drive shafts that extend upwardly from the support deck 42. A dispensing mechanism is illustrated diagrammatically in exploded form in FIG. 3 of the drawings and includes a disk 44 having four coffee-dispensing pockets 46 in its outer edge and an overlying plate 48. Disk 44 rests on the bottom of the container 40 and rotates between the bottom and the plate 48. Plate 48 is in face to face contact with disk 44.

Plate 48 is designed such that it covers two of the openings 46 of disk 44 and leaves two of the openings 46 exposed to coffee that is in the container 40. An opening 50 in the bottom of the container aligns with an opening in the deck 42. Thus, as the disk 44 rotates, coffee drops into the exposed pockets 46 thereof and is carried around underneath the plate 48 and dropped through the opening 50 and through the underlying opening in the deck 42 as the pocket passes the opening 50. An agitating device 51 is preferably fixed to the shaft 52, which is in turn fixed to disk 44 to maintain the granulated coffee in the container 40 agitated and flowing into the pockets 46 of the disk 44 as disk 44 rotates.

The numeral 54 refers to a motor for driving the mechanism of the dispenser 40. It directly connects with drive shaft 46 that communicates with and drives the disk 44. There is a separate motor for each of the three dispensing tubes 40, only one of which has been shown. Three dispensing tubes 40 are preferably used and the adjustment of the size of pockets 46 is such that the three tubes together meter the required amount of coffee through the openings and the cup underlying the funnel 58. In use, as each cup 14 is caused to underlie the funnel 58, the motor 54 operates one-half turn to rotate the disk 44 and carry two pockets over the outlet 50 whereby two pockets of coffee from each of the containers 40 are dropped through the hole 50 of each container and through into the funnel 58 to the underlying cup 16.

It will be appreciated that only one tube 40 has been illustrated in the drawings but that in fact there are three similar tubes, each of which connects with one of the three drive shafts 56 illustrated in the drawings. The drive means for each of the shafts 56 is identical. The dispensing mechanisms 40 and their operation to meter a granular material upon intermittent actuation is well known in the art and detailed explanation of the operation and construction is not, therefore, given in this specification. The requirement is for a dispensing mechanism that will upon actuation drop a predetermined amount of coffee into an underlying cup and mechanisms of this general type are well known. No claim is made to their novelty per se. It will be apparent that one or more of the three tubes could contain sugar so that a mixture of sugar and coffee could be dropped into an underlying cup. These things are variations that would be apparent to one skilled in the art.

The motor 24 is, in use, continuously operated. The output from the motor transmission 26 turns the plate 60. Plate 60 has a pair of pins 62 that engage the notches of the gear 64 at the lower end of the shaft 22. Thus, shaft 22 moves intermittently and moves twice for each rotation of the plate 60. Each intermittent movement locates one of the jigs 14 underneath the cup-depositing outlet to receive a cup in the case of an empty jig and one of the jigs underneath the coffee-dispensing funnel 58 to locate the cup therein in a position to receive a charge of coffee. The microswitch 36 operates to dispense a cup from the stack of cups into the empty jig 14 underneath the cup-stacking device 32, and the microswitch 66 operates drive motors 54 to dispense coffee into the cup underlying dispensing tubes 40. Also, with each intermittent movement, one of the jigs is carried over the edge of table 12 at the opening 18 to overlie the chute 28 whereby the cup contained in that particular jig drops into the chute 28 to nest on the previously deposited cup.

Chute 28 has a bottom that retains the first cup to drop therein and to support the cups which are subsequently dropped thereover in nesting relation. In result, each of the cups in the stack of cups 16 that collects in the tube 28 has a predetermined amount of instant granular coffee. When tube 28 is full of cups 16, the machine is stopped and the tube is removed from the clip that holds it to the machine, the top cup is sealed, and the stack of cups is dumped from the tube by overturning. The stack of cups, each charged with a predetermined amount of instant coffee, is then transported to the place of use where each cup is unstacked one at a time from the stack, either manually or automatically, and filled with water to constitute a cup of instant coffee. The advantage of the method to the person making a cup of coffee is that no metering of coffee into the cups at the time of making is necessary. Coffee can be supplied at a very fast rate of speed because the only requirement is to fill the cup with water. The important concept of the invention is the automatic movement of the cups across a table to locate them respectively under a cup-dispensing head and a filling head and the subsequent dropping of the cups over the edge of the table into a stacking chute. Embodiments of the invention, other than the one shown, will be apparent to those skilled in the art. The invention can be used for the measurement of granular materials other than instant coffee. For example, sugar and instant coffee could be conveniently mixed into the cups.

What I claim as my invention is:

1. A device for dispensing a granulated material into each of a series of stacked cups comprising: a table, a jig for a cup overlying said table; jig drive means adapted to cyclically carry said jig in a predetermined path over the surface of said table; the surface of said table having and edge on said predetermined path over which a cup in said jig can drop; cup-stacking means underlying said edge of said table on said predetermined path adapted to receive cups that drop over said edge; said jig being adapted to restrain a cup laterally but not vertically; depositing means overlying said table and on said predetermined path in advance of said opening on said predetermined path adapted to drop a cup into said jig as said jig underlies said depositing means; filling means overlying said table between said cup-stacking means and said depositing means adapted to drop predetermined amounts of filling into a cup retained in said jig as said jig underlies said filling means on said predetermined path.

2. A device as claimed in claim 1, in which said jig drive means cyclically carries said jigs, as aforesaid, with an intermittent movement, said depositing means and said filling means each being responsive to the presence of a cup retained in said jig when said jig underlies said depositing means and said filling means respectively to operate the depositing means and filling means respectively.

3. A device as claimed in claim 1, having a plurality of jigs, said jig drive means comprising means for holding said plurality of jigs in a circular array, said predetermined path being a circular path.

4. A device as claimed in claim 2, having a plurality of jigs, said jig drive means comprising means for holding said plurality of jigs in a circular array, said predetermined path being a circular path.

5. A device as claimed in claim 1, in which said predetermined path is a circular path.

6. A device as claimed in claim 2, in which said predetermined path is a circular path.

7. A method of dispensing a granulated material into each of a series of stacked cups comprising the steps of dropping said cups one at a time on a table, moving said cups in succession on a predetermined path on said table and then over an edge of said table, stacking said cups as they drop from said table, and depositing a predetermined amount of granulated material into said cups as they pass over said table.

8. A method as claimed in claim 5, in which said cups are moved over said table by means of a jig that restrains each cup laterally but not vertically.

9. A method as claimed in claim 5, in which said path is vertical.

10. A method as claimed in claim 6, in which said path is vertical.

* * * * *